United States Patent
Qian et al.

(10) Patent No.: US 7,489,109 B1
(45) Date of Patent: Feb. 10, 2009

(54) INTEGRATED BATTERY CHARGER AND SYSTEM REGULATOR CIRCUIT

(75) Inventors: Jinrong Qian, Plano, TX (US); Donald P. Folkes, Flower Mound, TX (US); Dean F. Henderson, Durham, NC (US)

(73) Assignee: Intersil Americas Inc., Milpitas, CA (US)

( * ) Notice: Subject to any disclaimer, the term of this patent is extended or adjusted under 35 U.S.C. 154(b) by 534 days.

(21) Appl. No.: 10/915,800

(22) Filed: Aug. 11, 2004

Related U.S. Application Data

(60) Provisional application No. 60/582,136, filed on Jun. 23, 2004.

(51) Int. Cl.
*H02J 7/00* (2006.01)
*H02J 7/04* (2006.01)

(52) U.S. Cl. .................. 320/135; 125/137; 125/140; 125/160

(58) Field of Classification Search .......... 320/135, 320/137, 140, 161, 162, 159, 134
See application file for complete search history.

(56) References Cited

U.S. PATENT DOCUMENTS

| | | | | |
|---|---|---|---|---|
| 5,723,970 A | * | 3/1998 | Bell | ............... 320/140 |
| 5,777,457 A | * | 7/1998 | Lee | ............... 320/137 |
| 6,144,187 A | * | 11/2000 | Bryson | ............... 320/137 |
| 6,452,364 B1 | * | 9/2002 | Saeki et al. | ............... 320/137 |
| 6,479,968 B1 | * | 11/2002 | Pozsgay et al. | ............... 320/137 |
| 6,605,879 B2 | * | 8/2003 | Wade et al. | ............... 307/66 |
| 6,605,926 B2 | * | 8/2003 | Crisp et al. | ............... 320/138 |
| 6,771,042 B2 | * | 8/2004 | Chen et al. | ............... 320/110 |
| 2003/0052651 A1 | * | 3/2003 | Crisp et al. | ............... 320/164 |
| 2003/0117112 A1 | * | 6/2003 | Chen et al. | ............... 320/137 |
| 2004/0075418 A1 | * | 4/2004 | Densham et al. | ............... 320/111 |

\* cited by examiner

*Primary Examiner*—Edward Tso
*Assistant Examiner*—Alexis Boateng
(74) *Attorney, Agent, or Firm*—Gary R. Stanford

(57) ABSTRACT

An integrated regulator and charging system including a DC/DC converter, a P-channel device, a battery system and a system/charger controller. The DC/DC converter converts an input voltage to a regulated voltage on a system bus. The battery system includes a rechargeable battery and a current sense device coupled in series between the drain of the P-channel device and ground, where the source of the P-channel device is coupled to the system bus. The system charger/controller regulates the system bus at a minimum voltage level when the battery voltage is below the minimum voltage level, such as a deeply discharged battery. The system charger/controller also regulates charge current through the battery when its voltage is between the minimum voltage level and a maximum voltage level and regulates the system bus at the maximum voltage level when the battery voltage is at the maximum voltage level.

20 Claims, 6 Drawing Sheets ically regulates battery charging current and battery voltage from an AC adapter. The AC adapter develops DC voltage on a system bus, which is also used to provide input voltage to one or more step-down DC/DC converters. A synchronous buck converter or the like controlled by a battery charger controller uses the system bus voltage as input voltage for developing a voltage used to charge a removable and rechargeable battery. A power source selection device coupled between the battery node and the system bus is turned on to provide power to the system when the AC adapter power source is not available.

A primary drawback for this power architecture is that the DC/DC converters have low power conversion efficiency from the relatively high voltage of system bus. In particular, the output of the AC adapter is between 16 and 20 Volts (V), which is relatively large as compared to the relatively low output voltage of the DC/DC converters, such as on the order of 1.2V or the like, to that the duty cycle of the DC/DC converters must be very small. A potential solution to improve the power conversion efficiency of the step-down DC/DC converters is to connect their inputs directly to the positive battery terminal, which also forms the system bus. A primary issue with this solution is that the voltage of system bus crashes (e.g., drops below a minimum voltage level) for the extremely discharged or bad battery, resulting in system failure.

It is desired to provide a reduced voltage system bus to improve the efficiency of step-down DC/DC converters while also coupling a rechargeable battery without threatening system failure in the event of a discharged or bad battery.

INTEGRATED BATTERY CHARGER AND SYSTEM REGULATOR CIRCUIT

CROSS-REFERENCE TO RELATED APPLICATIONS

This application claims the benefit of U.S. Provisional Application No. 60/582,136 filed on Jun. 23, 2004, which is herein incorporated by reference for all intents and purposes.

BACKGROUND OF THE INVENTION

1. Field of the Invention

The present invention relates to battery power management, and more particularly to an integrated battery charger and system regulator circuit that controls battery charging while preventing a system bus node from dropping below a minimum voltage level and to improve the power conversion efficiency.

2. Description of the Related Art

A conventional battery charging power circuit for computing systems or the like, such as laptop or notebook computers, typ

SUMMARY OF THE INVENTION

An integrated battery charger and system regulator according to an embodiment of the present invention includes a converter, a regulator device, a current sensing device and a controller. The converter converts an input voltage to a system voltage on a system node. The regulator device has a control terminal and a controlled current path coupled in a charge path of a rechargeable battery. The current sensing device senses charge current of the charge path. The controller controls the converter to regulate the system voltage between minimum and maximum voltage levels and operates in multiple modes, including a trickle charging mode, a current charging mode, and a voltage control mode. In the trickle charging mode, the controller controls the regulator device to maintain the system node at the minimum voltage level. In the current charging mode, the controller regulates the charge current. In the voltage control mode, the controller maintains the system node at the maximum voltage level.

In an exemplary embodiment, the regulator device is a P-channel field-effect transistor (FET) having a gate as the control terminal, a source as the first terminal and a drain as the second terminal. In a more specific embodiment, the controller operates the FET in a linear mode during the trickle charging mode when the drain of the FET is pulled below the minimum voltage level, such as by a deeply discharged or bad battery. In this manner, the system node does not drop below the minimum voltage level.

In another embodiment, the converter is a synchronous buck converter including first and second N-channel devices and an inductor. In a more specific embodiment, the controller adjusts a duty cycle of the first N-channel device during the trickle charging mode to regulate the system voltage at the minimum voltage level and during the voltage control mode to regulate the system voltage at the maximum voltage level.

The battery may be a battery pack incorporating the regulator device coupled to one or more series-coupled battery cells, which is further coupled to a current sensing device. In a more specific embodiment, the maximum voltage level of the system voltage is sufficiently low to improve efficiency of step-down DC/DC converters coupled to the system node as compared to being coupled to the input voltage. The input voltage may be developed by an AC adapter with a relatively high voltage level which would otherwise reduce the efficiency of the step-down DC/DC converters if coupled thereto.

The integrated battery charger and system regulator may include an adjustable AC adapter that converts an AC voltage to the input voltage based on an adjust signal. In this case, the converter provides the adjust signal to maintain the input voltage at a predetermined offset above the system voltage. The DC/DC converters may be divided into system load converters coupled to the input voltage and a CPU DC/DC converter coupled to the system voltage. Such configuration enables reduced current rating of the components of the converter (e.g., output inductor and power switching devices) since no longer having to support a portion of the system load, which enables higher overall conversion efficiency and lower component cost.

A regulator and charging system according to an embodiment of the present invention includes a DC/DC converter, a P-channel device, a battery system and a system/charger controller. The DC/DC converter converts an input voltage to a regulated voltage on a system bus. The source of the P-channel device is coupled to the system bus. The battery system includes a rechargeable battery and a current sense device coupled in series between the drain of the P-channel device and ground. The system charger/controller regulates the system bus at a minimum voltage level when the battery voltage is below the minimum voltage level, regulates charge current through the battery when its voltage is between the minimum voltage level and a maximum voltage level, and regulates the system bus at the maximum voltage level when the battery voltage is at the maximum voltage level.

In one embodiment, the system charger/controller operates the P-channel device in a linear mode when the battery voltage is below the minimum voltage level and otherwise turns on the P-channel device. In another embodiment, the DC/DC converter includes first and second N-channel FETs and an inductor. In a more specific embodiment, the system charger/controller adjusts the duty cycle of the N-channel FETs to regulate voltage on the system bus.

A method of charging a battery using a system/charger regulator circuit according to an embodiment of the present invention includes regulating a system bus to a voltage level between a minimum level and a maximum level, controlling a regulator device coupled between the system bus and the battery to maintain the system bus at the minimum level to trickle charge the battery when its voltage is below the minimum level, maintaining constant charge current through the battery when its voltage is between the minimum and maximum levels, and regulating the system bus at the maximum level when the battery voltage is approximately at the maximum level.

The method may include adjusting duty cycle of a DC/DC converter. The method may include operating the regulator device in a linear mode while trickle charging the battery and turning on the regulator device when the voltage of the battery is at or above the minimum level. The method may include sensing current through the battery and monitoring the voltage of the battery.

BRIEF DESCRIPTION OF THE DRAWINGS

The benefits, features, and advantages of the present invention will become better understood with regard to the following description, and accompanying drawings where.

DETAILED DESCRIPTION

The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

Figure 1:
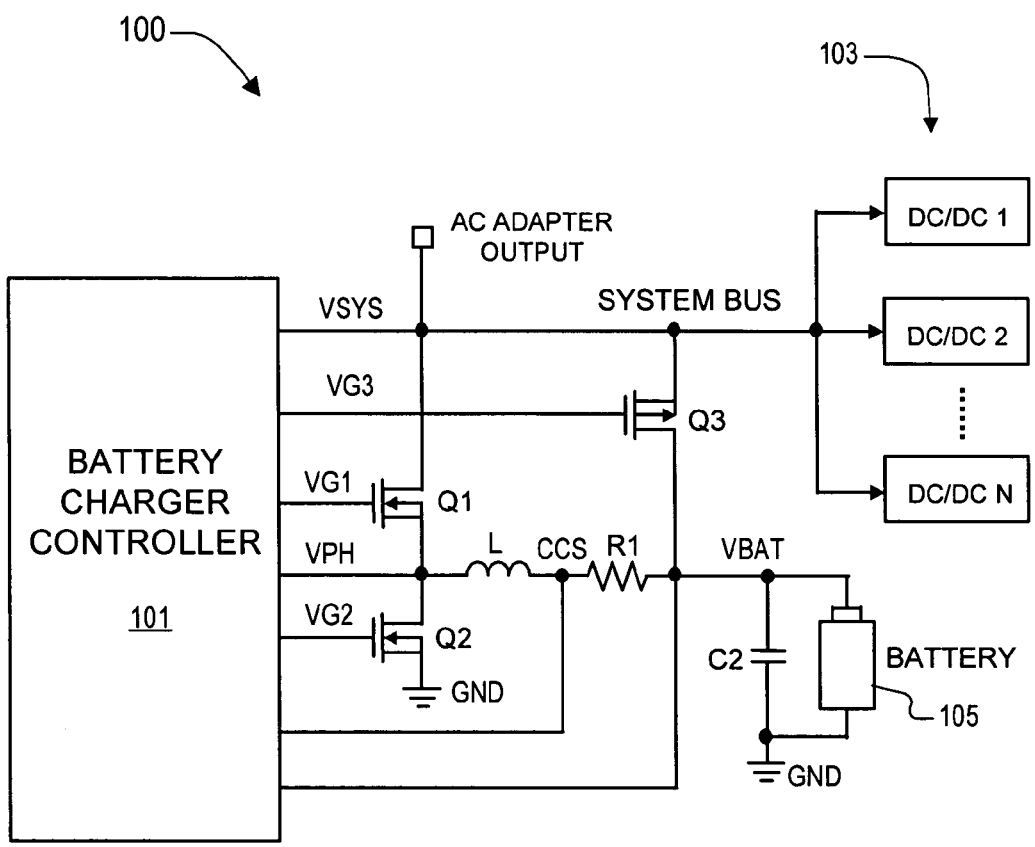
FIG. 1 is a simplified schematic and block diagram of a conventional battery charging power circuit architecture for computing systems.

FIG. 1 is a simplified schematic and block diagram of a conventional battery charging power circuit 100 for computing systems or the like, including notebook computers. As illustrated, a synchronous buck regulator topology is used to regulate the battery charging current and battery voltage from an AC adapter (not shown). A battery charger controller 101 receives a system voltage VSYS from an AC adapter via a SYSTEM BUS node, which is provided to the inputs of several (e.g., N) step-down DC/DC converters 103. The SYSTEM BUS is also coupled to the source of a P-channel metal-oxide-semiconductor field-effect transistor (MOSFET) Q3 and to the drain of an N-channel MOSFET Q1. The source of Q1 is coupled to the drain of another MOSFET Q2 at a phase node VPH, which is provided back to the battery charger controller 101 and coupled to one end of an output inductor L. The other end of the inductor L is coupled to a current charge sense node CCS, which is provided back to the battery charger controller 101 and coupled to one end of a sense resistor R1, having its other end coupled to a node VBAT. VBAT is coupled to the drain of Q3, to one end of a capacitor C2, to the positive terminal of a rechargeable battery 105, and is provided back to the battery charger controller 101. The negative terminal of the battery 105 and the other end of the capacitor C2 are coupled to a common node, such as ground (GND). The battery charger controller 101 generates gate signals VG1, VG2 and VG3 provided to control the MOSFETs Q1, Q2 and Q3, respectively.

Q1 and Q2 are electronic switches or the like controlled by the battery charger controller 101 forming a buck regulator for developing the VBAT battery voltage for charging the battery 105. Although a buck regulator is illustrated, other types of DC/DC regulators are contemplated, including those that employ one or more electronic switching devices. The AC adapter output voltage is not only used as the input voltage of the buck regulator, but is also used as the input voltage of the DC/DC converters 103. Q3 is a power source selection device, which is turned on to provide the power to the system from the battery 105 when the AC adapter power source is not available. A primary drawback for this power architecture is that the DC/DC converters 103 have low power conversion efficiency from the relatively high voltage of SYSTEM BUS, which is typically between 16V and 20V, to the relatively low output voltage, such as 1.2V, since the duty cycle is too small.

Figure 2:
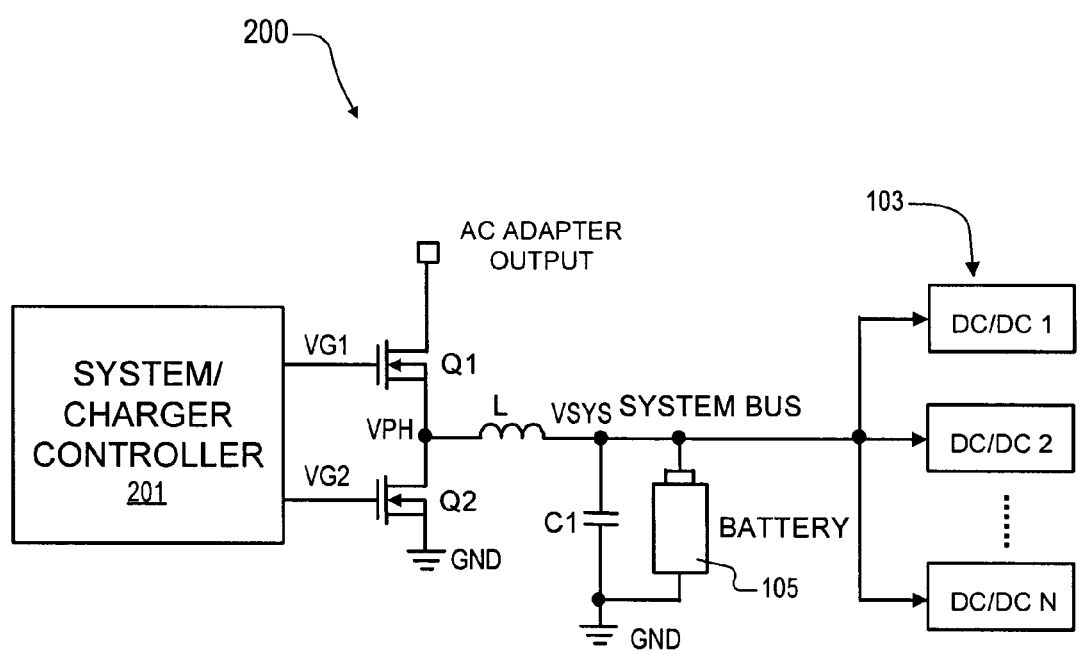
FIG. 2 is a simplified schematic and block diagram of a battery charging power circuit architecture similar to the conventional battery charging power circuit architecture of FIG. 1 and modified in an attempt to improve power conversion efficiency.

FIG. 2 is a simplified schematic and block diagram of a battery charging power circuit 200 similar to the conventional battery charging power circuit 100 and modified in an attempt to improve power conversion efficiency. Similar components as those of the battery charging power circuit 100 are shown with identical reference numbers. In order to improve the power conversion efficiency of the step-down DC/DC converters 103, it is necessary to reduce the voltage of SYSTEM BUS to increase the duty cycle. The solution illustrated by the battery charging power circuit 200 is to connect the inputs of the step-down DC/DC converters 103 directly to the positive battery terminal, which also forms the SYSTEM BUS node in this case. The capacitor C2 is replaced with a capacitor C1 placed in parallel with the battery 105 coupled between SYSTEM BUS and GND. The battery charger controller 101 is replaced with a system and charger controller 201 providing the VG1 and VG2 signals to the gates of Q1 and Q2, respectively. A primary issue with the solution of the battery charging power circuit 201 is that the voltage of SYSTEM BUS crashes (e.g., drops below a minimum voltage level) for the extremely discharged or bad battery 105, resulting in system failure.

Figure 3:
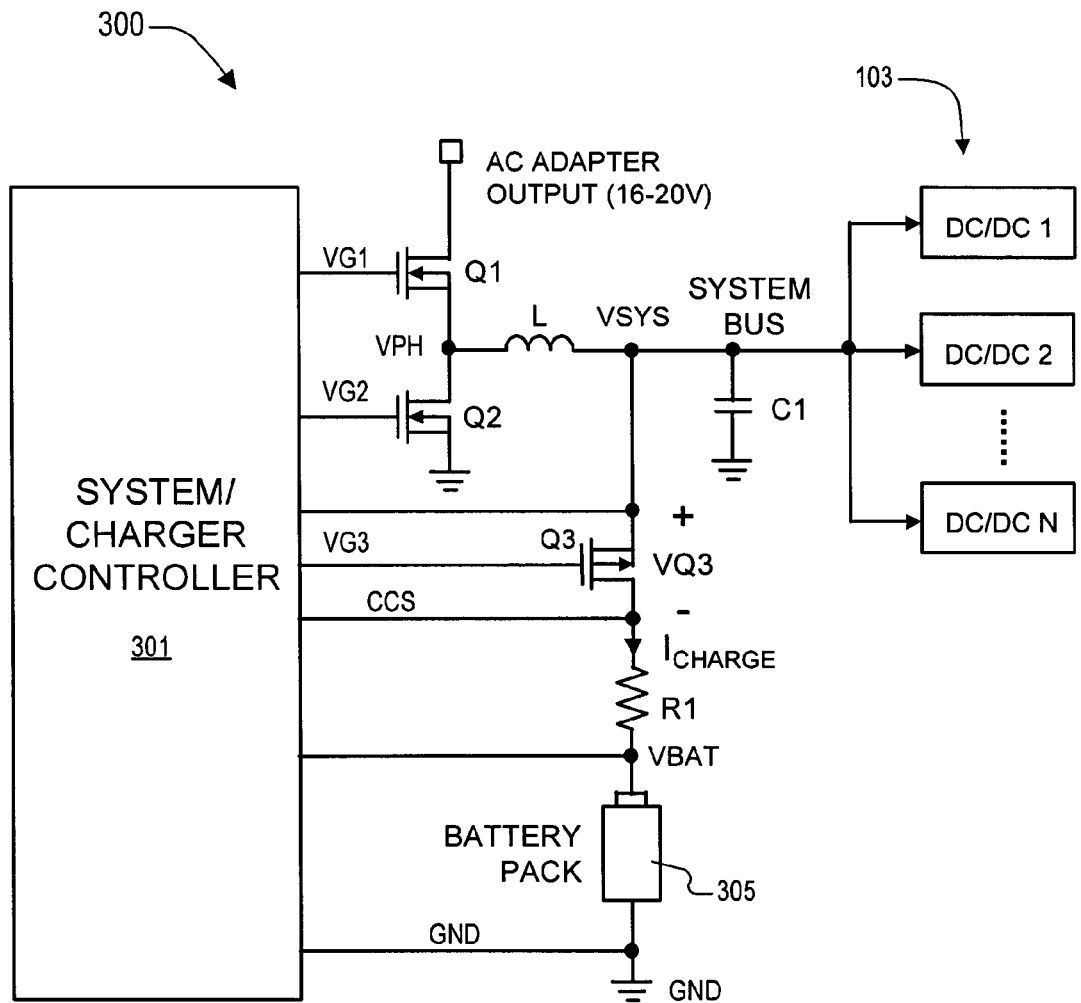
FIG. 3 is a simplified schematic and block diagram of an exemplary integrated battery charger and system regulator circuit implemented according to an embodiment of the present invention.

FIG. 3 is a simplified schematic and block diagram of an exemplary integrated battery charger and system regulator circuit 300 implemented according to an embodiment of the present invention. Similar components as those of circuits 100 and 200 are shown with identical reference numbers. In this case, the SYSTEM BUS developing the system voltage VSYS is coupled to the source of Q3, which receives a signal VG3 at its gate and which has its drain coupled to one end of sense resistor R1 at a charge current sense node CCS. It is noted that the VG3 signal of the integrated battery charger and system regulator circuit 300 is operated in a significantly different manner as compared to the conventional battery charging power circuit 100. In particular, the battery charger controller 101 of the conventional circuit simply keeps Q3 off via its VG3 signal when the AC adapter output is available, but otherwise turns Q3 fully on when the battery 105 is available while the AC adapter is not. The integrated battery charger and system regulator circuit 300 includes a system and charger controller 301 which controls Q3 via the VG3 signal in a unique manner, as further described below, to protect the SYSTEM BUS while also enabling charging of a battery pack 305.

The other end of R1 is coupled to the positive terminal of the battery pack 305 at a node VBAT. The nodes VSYS, CCS and VBAT are provided back to the system and charger controller 301, which provides the VG1, VG2 and VG3 signals to the gates of MOSFETs Q1, Q2 and Q3, respectively. A battery charging current ICHARGE flows through the battery charging current sensing resistor R1 and the battery pack 305, and a voltage developed at the CCS node indicates the level of battery charging current. The MOSFETs Q1 and Q2 are used as the synchronous buck converter power switching elements. Inductor L and capacitor C1 are the output inductor and output filter capacitor, respectively. Q3 is employed in multiple modes to control the battery charging and discharging as further described below. For a typical Lithium-Ion (Li-Ion) battery, there are three charging modes: trickle charging mode, constant current charging mode and constant voltage charging mode. In the following analysis, the exemplary battery pack 305 includes 3 battery cells in series (3S), each having an operative voltage range of 2.9V (fully discharged) to 4.2V (fully charged). It is appreciated that such voltage levels and ranges are exemplary only and that other voltage levels and ranges are contemplated. Also, the voltage of any one or more cells of a deeply discharged battery may drop below the exemplary minimum level of 2.9V.

Figure 4:
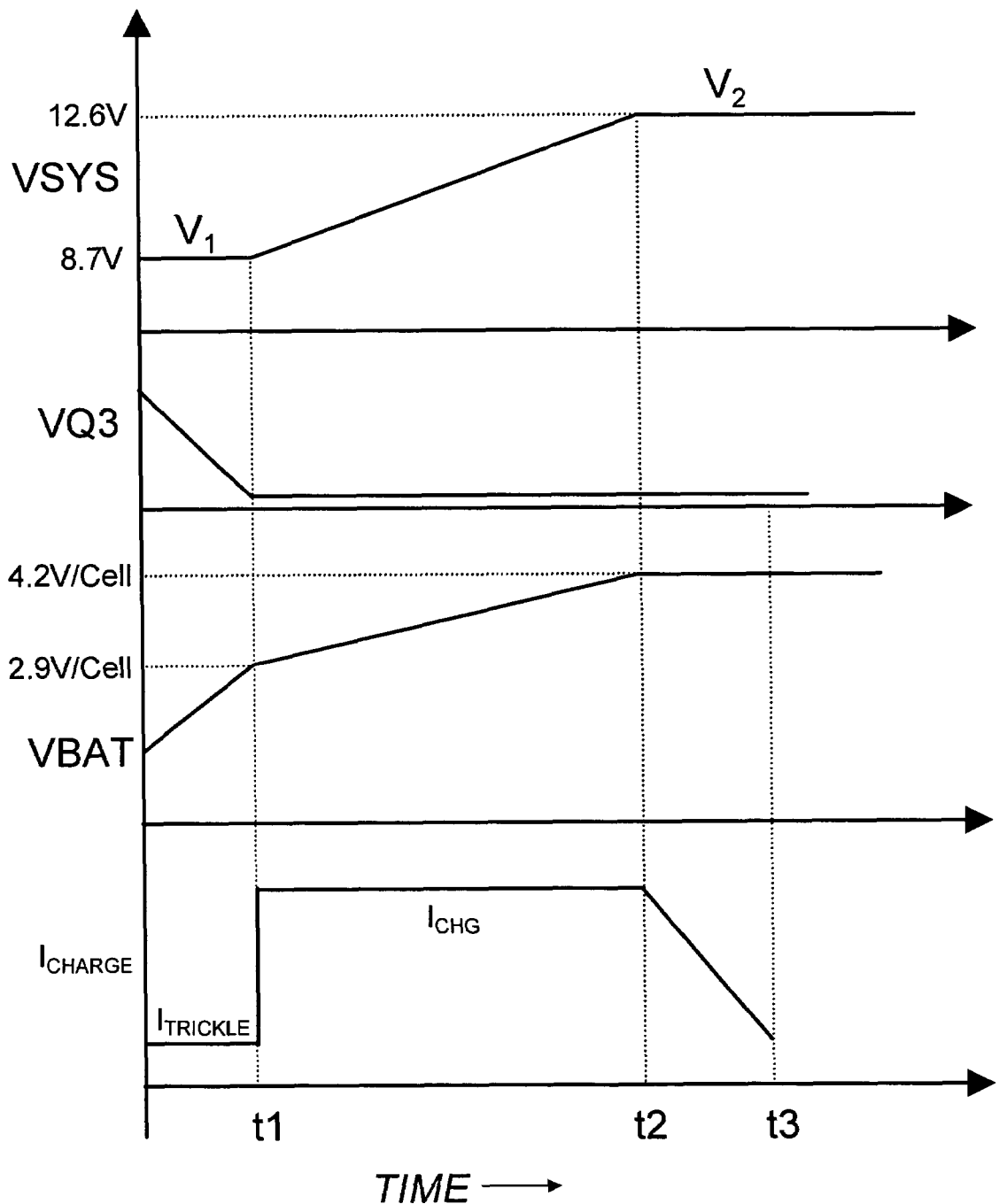
FIG. 4 is a timing diagram illustrating exemplary waveforms of the integrated battery charger and system regulator circuit of FIG. 3.

FIG. 4 is a timing diagram illustrating exemplary waveforms of the integrated battery charger and system regulator circuit 300 plotted versus TIME (t), including VSYS, VQ3, VBAT and ICHARGE. For time $t<t_1$, the battery voltage VBAT is less than 2.9V/cell and the battery charger provides the trickle charging current which is typically less than 10% of the specified full scale battery charging current. Again, 2.9V is exemplary only and different minimum cell voltages may be employed for similar or different configurations. The trickle charging current is regulated by adjusting the gate voltage of Q3, so that Q3 operates as a linear regulator with input voltage of VSYS and output voltage VBAT. Q3 operates in a linear regulator mode while the synchronous buck converter is used to regulate VSYS at a minimum voltage level $V_1$, such as, for example, 8.7V, by adjusting the duty cycle of Q1. During this period, VQ3 is equal to the regulated VSYS minus the VBAT, wherein VBAT is allowed to be below the minimum voltage level of VSYS without crashing the SYSTEM BUS. As VBAT linearly increases, VQ3 linearly decreases so that VSYS stays relatively constant at the minimum voltage level. Since the trickle charging current ICHARGE is relatively small during this time, the power dissipation across the linear regulator device Q3 is not significant. In contrast to the operation of the battery charging power circuit 200, Q3, operating as a linear regulator in the trickle charge mode, prevents crashing (e.g., decrease) of the voltage level VSYS of the SYSTEM BUS if the battery pack 305 is extremely discharged or bad.

Once the voltage of the battery pack 305 reaches 2.9V/cell at time t1, Q3 is completely turned on. The battery charging current ICHARGE is sensed through the sensing resistor R1 and is regulated in a constant current charging mode by adjusting the duty cycle of Q1. Thus, the VSYS voltage of the SYSTEM BUS is not regulated in the second mode or the constant charge current mode between times t1 and t2. So, the SYSTEM BUS voltage is given by the following equation 1:

$$VSYS=VBAT+VQ3+R1(ICHARGE) \tag{1}$$

where VQ3 is the voltage drop across the source and drain of Q3. Since the voltage drop across Q3 and the voltage drop across the current sensing resistor R1 are very small, the SYSTEM BUS voltage is almost the same as the battery voltage VBAT. As VBAT linearly rises during the constant current charging mode between times t1 and t2, VSYS linearly rises. When VBAT reaches a predetermined maximum voltage level $V_2$ (such as, for example, 4.2V/cell for 3 cells or 12.6V) at a time t2, the synchronous buck converter is used to regulate VBAT at $V_2$ while the battery charging current ICHARGE is no longer regulated. Instead, a constant voltage charging mode is employed to maintain VBAT and VSYS at the maximum voltage level $V_2$. In particular, the SYSTEM BUS voltage is equal to number of battery cells times 4.2V/cell, which is 12.6V for a 3-cell Li-Ion battery.

Figure 5:
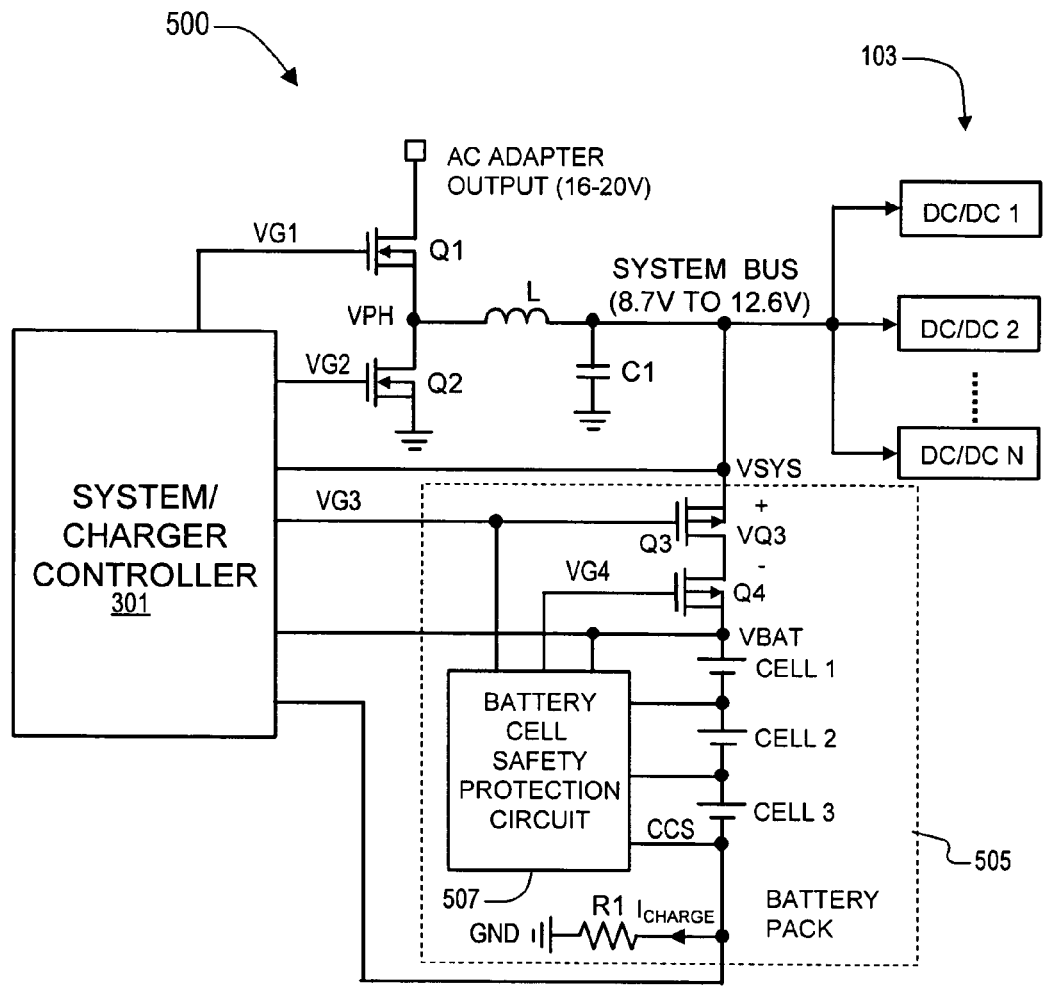
FIG. 5 is a simplified schematic and block diagram of another exemplary integrated battery charger and system regulator circuit implemented according to an alternative embodiment of the present invention employing an integrated battery pack.

FIG. 5 is a simplified schematic and block diagram of another exemplary integrated battery charger and system regulator circuit 500 implemented according to an alternative embodiment of the present invention. Similar components as those of circuits 100, 200 and 300 are shown with identical reference numbers. The battery pack 305 is replaced with an integrated battery pack 505, which incorporates the P-channel MOSFET Q3, another P-channel MOSFET Q4, the sense resistor R1, three (3) cells CELL 1, CELL 2 and CELL 3, and a battery cell safety protection circuit 507. The exemplary operating voltage range of 2.9 to 4.2V per cell is again employed for purposes of illustration for the battery pack 505. The three battery cells (3S) are coupled in series between the VBAT and CCS nodes, which are coupled to the battery cell safety protection circuit 507 and provided back to the system and charger controller 301. The battery cell safety protection circuit 507 is also coupled to each terminal of each of the battery cells 1-3. The source of Q3 is coupled to VSYS and its drain is coupled to the drain of Q4, having its source coupled to VBAT. The battery cell safety protection circuit 507 provides a gate control voltage VG4 to the gate of Q4 and R1 is coupled between CCS and GND.

In a similar manner as the integrated battery charger and system regulator circuit 300, Q3 operates as a linear regulator in linear regulator mode when the battery cell voltage is below the minimum voltage level of 2.9V/cell for the integrated battery charger and system regulator circuit 500. The trickle charging current is sensed through the sensing resistor R1 in the battery pack 505 and regulated by the system and charger controller 301 adjusting VG3 to control Q3. The VSYS voltage is regulated by the duty cycle of the synchronous buck converter. The rest of the circuit operation is similar to that of the battery charger and system regulator circuit 300. The advantage of the integrated battery charger and system regulator circuit 500 is that Q3 has two functions: a linear regulator and a battery charging safety switch. As a result, it can save one MOSFET and also it can improve the battery run times because it has lower power dissipation in battery discharging mode. In addition, only one battery current sensing resistor is used, which results in lower BOM (bill of materials) cost and also improves the battery life due to less power dissipation.

Figure 6:
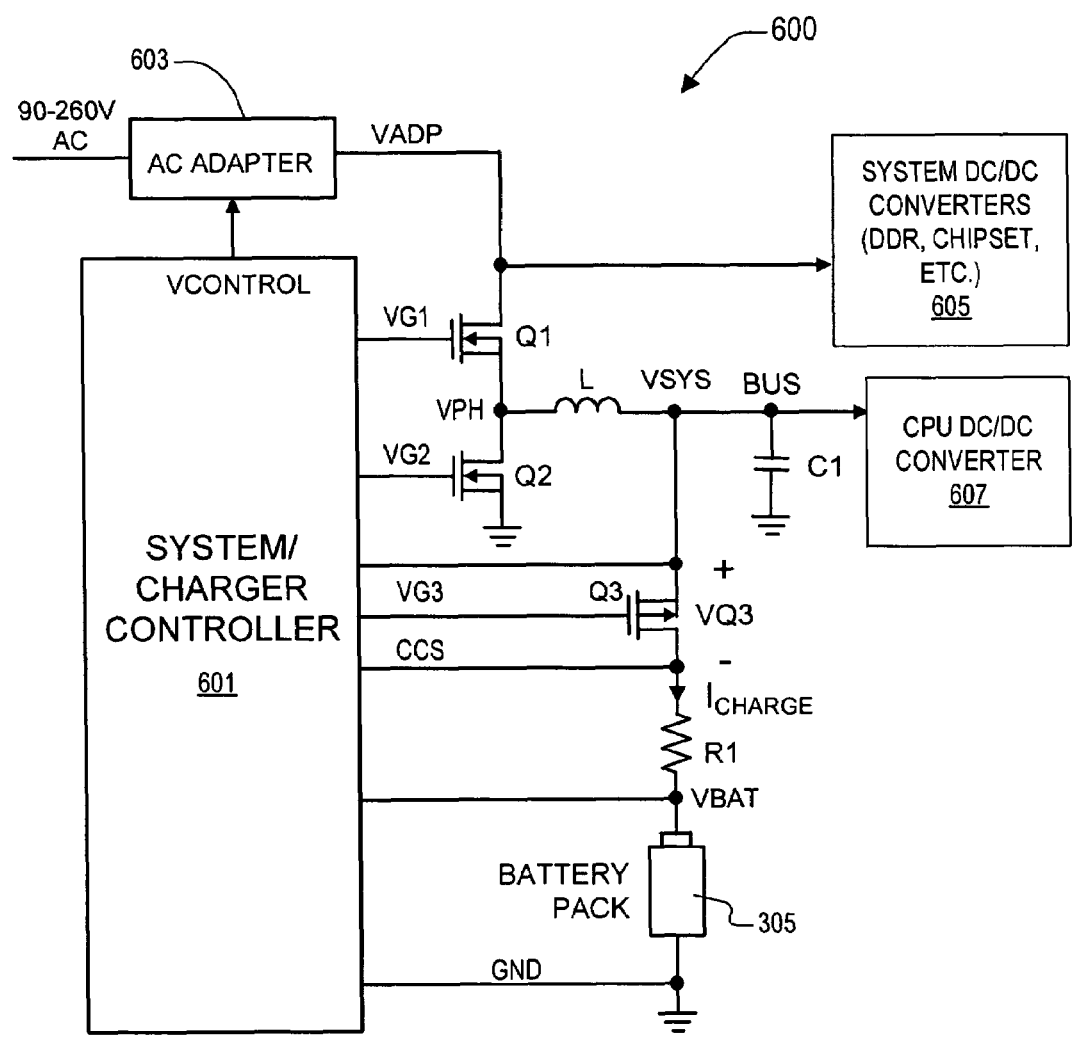
FIG. 6 is a simplified schematic and block diagram of yet another exemplary integrated battery charger and system regulator circuit implemented according to an alternative embodiment of the present invention employing an adjustable AC adapter.

FIG. 6 is a simplified schematic and block diagram of yet another exemplary integrated battery charger and system regulator circuit 600 implemented according to an alternative embodiment of the present invention employing an adjustable AC adapter 603. The integrated battery charger and system regulator circuit 600 is similar to the circuit 300 in which similar components are shown with identical reference numbers. The system and charger controller 301 is replaced with a similar system and charger controller 601 which functions in a similar manner and further includes an output pin/signal VCONTROL provided to an input of the adjustable AC adapter 603. The AC adapter 603 receives an AC signal, such as ranging between 90-260V AC, and provides a DC output signal VADP. The step-down DC/DC converters 103 are divided into a set of system load DC/DC converters 605, such as for DDR memory and the chip set and the like, coupled to the VADP signal, and a CPU DC/DC converter 607 coupled to the VSYS signal.

The integrated battery charger and system regulator circuit 600 enables reduced current rating of the inductor L and the power MOSFETs Q1 and Q2 by moving the set of system load DC/DC converters 605 to the VADP signal output from the AC adapter 603. To further improve the efficiency, the system and charger controller 601 adjusts the output voltage VADP of the AC adapter 603 via the VCONTROL signal so that VADP is a relatively small offset higher than VSYS. For example, the offset is a relatively constant amount just large enough to ensure proper operation of the power MOSFETs Q1 and Q2. The integrated battery charger and system regulator circuit 600 has higher overall conversion efficiency and lower component cost due to lower current rated devices as compared to the circuits 300 and 500.

Although the present invention has been described in considerable detail with reference to certain preferred versions thereof, other versions and variations are possible and contemplated. Those skilled in the art should appreciate that they can readily use the disclosed conception and specific embodiments as a basis for designing or modifying other structures for providing out the same purposes of the present invention without departing from the spirit and scope of the invention as defined by the appended claims.

What is claimed is:

1. An integrated battery charger and system regulator, comprising:
   a converter having a first terminal coupled to an input node for receiving an input voltage, a second terminal coupled to a system node, and a control terminal for controlling said converter to convert said input voltage to a system voltage on said system node;
   a regulator device having a control terminal and first and second terminals forming a controlled current path coupled in a charge path of a rechargeable battery, said first terminal coupled to said system node;
   a current sensing device that senses charge current of said charge path; and
   a controller, coupled to said current sensing device, said converter control input and said regulator device control terminal, that controls said converter to regulate said system voltage between minimum and maximum voltage levels and that operates in a plurality of modes, including a trickle charging mode for controlling said regulator device to maintain said system node at said minimum voltage level, a current charging mode for regulating said charge current, and a voltage control mode for maintaining said system node at said maximum voltage level.

2. The integrated battery charger and system regulator of claim 1, wherein said regulator device comprises a P-channel field-effect transistor (FET) having a gate as said control terminal, a source as said first terminal and a drain as said second terminal.

3. The integrated battery charger and system regulator of claim 2, wherein said controller operates said FET in a linear mode during said trickle charging mode when said drain of said FET is pulled below said minimum voltage level.

4. The integrated battery charger and system regulator of claim 1, wherein said converter is a synchronous buck converter comprising:
   a first N-channel device having a drain coupled to said input voltage, a source coupled to a phase node and a gate coupled to said controller;
   a second N-channel device having a drain coupled to said phase node, a source coupled to ground and a gate coupled to said controller; and
   an inductor having a first end coupled to said phase node and a second end coupled to said system node.

5. The integrated battery charger and system regulator of claim 4, wherein said controller adjusts a duty cycle of said first N-channel device during said trickle charging mode to regulate said system voltage at said minimum voltage level and during said voltage control mode to regulate said system voltage at said maximum voltage level.

6. The integrated battery charger and system regulator of claim 1, further comprising a battery pack incorporating said regulator device coupled to a plurality of series-coupled battery cells coupled to said current sensing device.

7. The integrated battery charger and system regulator of claim 1, wherein said maximum voltage level is sufficiently low to improve efficiency of a plurality of step-down DC/DC converters coupled to said system node as compared to being coupled to said input voltage.

8. The integrated battery charger and system regulator of claim 1, further comprising:
   an adjustable AC adapter that converts an AC voltage to said input voltage based on an adjust signal; and
   said converter providing said adjust signal to maintain said input voltage at a predetermined offset above said system voltage.

9. A regulator and charging system, comprising:
   a DC/DC converter that converts an input voltage to a regulated voltage on a system bus;
   a P-channel device having a source coupled to said system bus, a drain and a gate;
   a battery system including a rechargeable battery and a current sense device coupled in series between said drain of said P-channel device and ground; and
   a system charger/controller having a first output coupled to said DC/DC converter, a second output coupled to said gate of said P-channel device, a first input coupled to said system bus, a second input coupled to said current sense device, and a third input coupled to said battery;
   wherein said system charger/controller regulates said system bus at a minimum voltage level when said third input is pulled below said minimum voltage level, regulates charge current through said battery while said third input is between said minimum voltage level and a maximum voltage level, and regulates said system bus at said maximum voltage level when said third input is at said maximum voltage level.

10. The regulator and charging system of claim 9, wherein said system charger/controller operates said P-channel device in a linear mode when said third input is pulled below said minimum voltage level and turns on said P-channel device when said third input is at or above said minimum voltage level.

11. The regulator and charging system of claim 9, wherein said DC/DC converter comprises:
   a first N-channel FET having a drain coupled to said input voltage, a source coupled to a phase node and a gate coupled to said system charger/controller;
   a second N-channel FET having a drain coupled to said phase node, a source coupled to ground and a gate coupled to said system charger/controller; and
   an inductor having a first end coupled to said phase node and a second end coupled to said system bus.

12. The regulator and charging system of claim 11, wherein said system charger/controller adjusts duty cycle of said first and second N-channel FETs to regulate voltage on said system bus.

13. The regulator and charging system of claim 9, wherein said current sense device comprises a resistor coupled between said second and third inputs of said system charger/controller and wherein said battery is coupled between said third input of said system charger/controller and ground.

14. The regulator and charging system of claim 9, wherein said current sense device comprises a resistor coupled between said second input of said system charger/controller and ground and wherein said battery is coupled between said second and third inputs of said system charger/controller.

15. A method of charging a battery using a system/charger regulator circuit, comprising:
   regulating a system bus to a voltage level between a minimum level and a maximum level;
   controlling a regulator device, coupled between the system bus and the battery, to maintain the system bus at the minimum level to trickle charge the battery when its voltage is below the minimum level, wherein said trickle charge comprises a constant and reduced charging current;
   maintaining constant charge current through the battery when its voltage is between the minimum and maximum levels; and
   regulating the system bus at the maximum level when the battery voltage is approximately at the maximum level.

16. The method of claim 15, wherein said regulating the system bus to a voltage level between a minimum level and a maximum level and said regulating the system bus at the maximum level comprises adjusting duty cycle of a DC/DC converter.

17. The method of claim 15, wherein said controlling a regulator device comprises operating the regulator device in a linear mode.

18. The method of claim 15, further comprising turning on the regulator device when the voltage of the battery is at or above the minimum level.

19. The method of claim 15, wherein said maintaining constant charge current through the battery includes sensing current through the battery.

20. The method of claim 15, further comprising monitoring the voltage of the battery.

* * * * *